US012792611B2

(12) United States Patent
Basilio et al.

(10) Patent No.: US 12,792,611 B2
(45) Date of Patent: Nov. 10, 2026

(54) ARTIFICIAL INTELLIGENCE SYSTEM FOR GENERATION OF PERSONALIZED STUDY PLANS

(71) Applicant: ADP, Inc., Roseland, NJ (US)

(72) Inventors: Cristian Basilio, Porto Alegre (BR); Roberto Dias, Porto Alegre (BR); Stefan Zanona, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 1243 days.

(21) Appl. No.: 17/551,555

(22) Filed: Dec. 15, 2021

(65) Prior Publication Data

US 2023/0185811 A1 Jun. 15, 2023

(51) Int. Cl.
*G06F 16/2457* (2019.01)
*G09B 5/08* (2006.01)

(52) U.S. Cl.
CPC ......... *G06F 16/24575* (2019.01); *G09B 5/08* (2013.01)

(58) Field of Classification Search
None
See application file for complete search history.

(56) References Cited

U.S. PATENT DOCUMENTS 10,205,796 B1 * 2/2019 McFall ............... H04L 67/1097
10,311,742 B2 * 6/2019 Falash ...................... G09B 7/00
10,318,499 B2 * 6/2019 González Brenes . G06F 16/213
10,642,848 B2 * 5/2020 Oros ....................... H04W 4/18
11,244,576 B2 * 2/2022 Baker ...................... G09B 7/00
11,455,903 B2 * 9/2022 Lynch .................... G06Q 50/20
2005/0193335 A1 * 9/2005 Dorai .................... G06F 16/972
707/999.102

(Continued)

FOREIGN PATENT DOCUMENTS

WO WO-2022164649 A1 * 8/2022 ......... G06F 21/6218

OTHER PUBLICATIONS

Kaiming He et al; "Deep Residual Learning for Image Recognition"; Microsoft Research; arXiv:1512.03385v1; Dec. 10, 2015; 12 pages.

(Continued)

*Primary Examiner* — Xuan M Thai
*Assistant Examiner* — Andrew Bodendorf
(74) *Attorney, Agent, or Firm* — Foley & Lardner LLP

(57) ABSTRACT

A system for providing study plans to a user includes a topic catalog storing multiple topics and multiple keywords associated with each topic. The system also includes a plan generator configured to receive multiple sample study plans, each sample study plan having one or more resources, each resource having one or more portions, and each portion being assigned a duration. The plan generator uses the sample study plans and the topic catalog to train a topic model to identify which topics are associated with each resource, resulting in a trained topic model. The plan generator receives a profile of a student from a user, the profile having one or more selected topics the student desires to study and further having multiple preferences associated with the student. The plan generator uses the trained topic model and the profile to identify a subset of the resources that are associated with the selected topics, generates a customized study plan for the student using the subset of identified resources and the preferences, and provides the customized study plan to the user.

20 Claims, 14 Drawing Sheets

(56) References Cited

U.S. PATENT DOCUMENTS

2008/0033982 A1* 2/2008 Parikh ..................... G06F 16/31 707/999.102
2011/0295850 A1* 12/2011 Tankovich .............. G06F 17/00 707/E17.084
2014/0024009 A1* 1/2014 Nealon .................... G09B 5/12 434/362
2014/0365499 A1* 12/2014 Parikh ................... G06F 16/951 707/741
2015/0066479 A1* 3/2015 Pasupalak ......... G06F 16/90332 704/9
2015/0206441 A1* 7/2015 Brown ............... G06Q 50/2053 434/319
2015/0243176 A1* 8/2015 Zaslavsky ........... G06F 3/04842 434/322
2016/0012538 A1* 1/2016 Costaceque-Cecchi-Dimeglio ..... G06Q 50/20 705/36 R
2016/0132607 A1* 5/2016 Skatell .............. G06F 16/24578 707/734
2016/0189034 A1* 6/2016 Shakeri .................... G09B 5/00 706/47
2016/0189036 A1* 6/2016 Shakeri ............... G06F 16/2455 706/47
2016/0358489 A1* 12/2016 Canter ..................... G06N 5/04
2017/0019496 A1* 1/2017 Orbach .................. G06Q 50/01
2017/0186331 A1* 6/2017 Lawrenson .............. G09B 5/02
2017/0235848 A1* 8/2017 Van Dusen ........ G06Q 30/0201 705/12
2018/0108268 A1* 4/2018 Singh ..................... G09B 5/125
2018/0261118 A1* 9/2018 Morris ...................... G09B 5/12
2018/0268291 A1* 9/2018 Turner ................... G06N 3/088
2018/0330628 A1* 11/2018 Ahn ......................... G09B 7/02
2018/0341871 A1* 11/2018 Maitra ................. G06N 3/0442
2019/0188591 A1* 6/2019 Kao ........................ G06F 17/18
2019/0287416 A1* 9/2019 Brinton .................... G09B 5/02
2020/0185098 A1* 6/2020 Stevens .................. G06N 5/022
2020/0233903 A1* 7/2020 Mashrabov ............. H04L 51/10
2020/0302820 A1* 9/2020 Sherman .................. G09B 7/02
2020/0357296 A1* 11/2020 Sharma .............. G06Q 50/2057
2021/0005099 A1* 1/2021 Agley ...................... G06N 7/01
2021/0201690 A1* 7/2021 Keat ........................ G09B 7/00
2021/0294811 A1* 9/2021 Buhrmann ............ G06F 16/285
2021/0342720 A1* 11/2021 Terra ........................ G06N 5/04
2022/0005368 A1* 1/2022 Trim .................. G06Q 50/2057
2022/0114900 A1* 4/2022 Qiu .......................... G06N 3/08
2022/0262268 A1* 8/2022 Mohanty ............... G06F 16/285
2022/0319346 A1* 10/2022 Sundararajan ........... G09B 7/02
2022/0358611 A1* 11/2022 Onal .................. G06Q 50/2057
2023/0127525 A1* 4/2023 Rai ........................ G06V 10/74 706/21
2023/0252355 A1* 8/2023 Tao ........................ G06N 3/045 706/12

OTHER PUBLICATIONS

International Search Report and Written Opinion issued in corresponding International Application No. PCT/US2022/081640, dated Mar. 21, 2023 (11 pages).

* cited by examiner

100

105

| STUDY PLAN 12345 | | | | | |
|---|---|---|---|---|---|
| 111 | Python 101: Basics of Syntax | http://... | Video | 1h 30min | Python, Syntax |
| 112 | Python 101: If and Then | http://... | Video | 45min | Python, Conditionals |
| 113 | Python Complete: Chapter 4, Introduction to OOP | ISBN ... | Textbook Chapter | 1 week | Python, Object Oriented |
| 114 | Python for Data Science | http://... | Blog post | 30min | Python, Data Science |
| | 120 | 122 | 125 | 130 | 135 |

FIG. 1

ARTIFICIAL INTELLIGENCE SYSTEM FOR GENERATION OF PERSONALIZED STUDY PLANS

BACKGROUND

1. Technical Field

The present disclosure relates to an artificial intelligence system. The system may be used for generation of personalized study plans for students to learn about topics of study.

2. Introduction

In learning a topic of study or trying to acquire a new skill, a student faces a number of challenges. The student may not have a study plan and may not be sure how to create one. The student also needs some way to measure their own progress and determine what the best courses are that are suited to their current skills, considering the knowledge that they already have. Without knowing how to organize their studies, the student may feel that they have hit a wall, and that standardized courses are either too slow or too fast for them. Moreover, a student's mentor or manager may find it difficult to engage an expert to create a study plan and help another colleague. Furthermore, current online learning systems only provide generic learning plans and provide little to no customization to the student.

SUMMARY

According to an embodiment, a system for providing study plans to a user includes a topic catalog that stores multiple topics and multiple keywords associated with each topic. The system also includes a plan generator that is configured to receive multiple sample study plans, each sample study plan having one or more resources, each resource having one or more portions, and each portion being assigned a duration. The plan generator is configured to use the sample study plans and the topic catalog, to train a topic model to identify which topics are associated with each resource, resulting in a trained topic model. The plan generator is also configured to receive a profile of a student from a user, the profile having one or more selected topics the student desires to study and further having multiple preferences associated with the student. The plan generator is configured to use the trained topic model and the profile, to identify a subset of the resources that are associated with the selected topics, generate a customized study plan for the student using the subset of identified resources and the preferences, and provides the customized study plan to the user.

According to another embodiment, a non-transitory computer-readable medium stores a set of instructions which when executed by a computer, configure the computer to receive multiple sample study plans, each sample study plan including one or more resources, each resource including one or more portions, and each portion being assigned a duration. The computer is further configured to receive a topic catalog that includes multiple topics and multiple keywords associated with each topic. The computer is further configured to use the sample study plans and the topic catalog to train a topic model to identify which topics are associated with each resource, resulting in a trained topic model. The computer is further configured to receive a profile of a student from a user, the profile including one or more selected topics the student desires to study and further including preferences associated with the student. The computer is further configured to use the trained topic model and the profile to identify a subset of the resources that are associated with the selected topics, generate a customized study plan for the student using the subset of identified resources and the preferences, and provide the customized study plan to the user.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The foregoing and other features and advantages will be apparent from the following, more particular, description of various embodiments, as illustrated in the accompanying drawings, FIG. 1 illustrates a sample study plan 100 of some embodiments.

DETAILED DESCRIPTION

Figure 2:
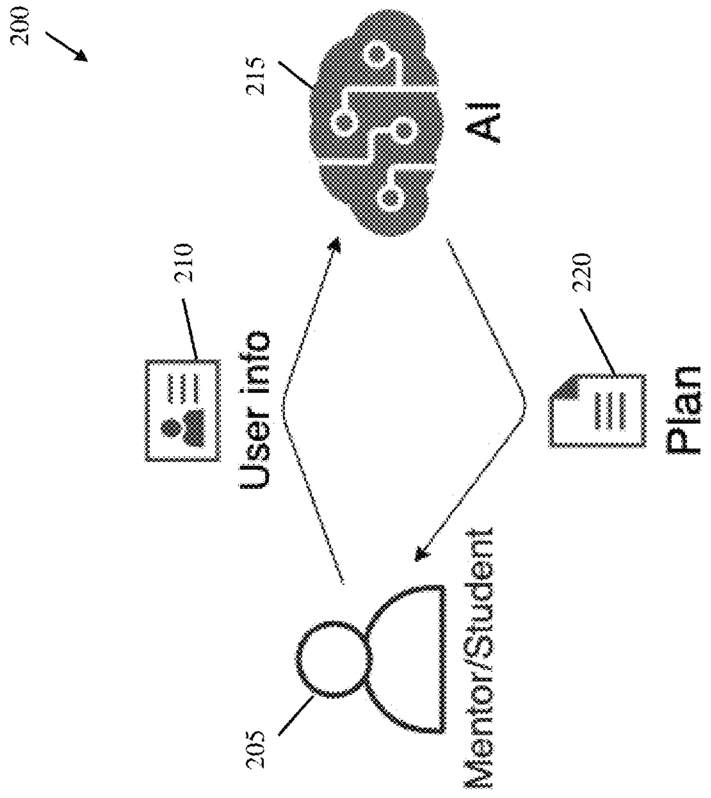
FIG. 2 illustrates a use case scenario 200 of the system in some embodiments.

Various embodiments of the disclosure are described in detail below. While specific implementations are described, it should be understood that this is done for illustration purposes only. Other components and configurations may be used without parting from the spirit and scope of the disclosure.

In various embodiments, a system with one or more components is provided for creating, managing, and sharing customized study plans using machine learning. The system includes an artificial intelligence (AI) agent, that receives as input the user's profile of current skills, interests, and topics of desired study, and uses that information to generate a personalized study plan as an output. The system provides study plans that are customized for the users based on the initial input of the user profile, and continuously refines the study plan based on additional input by monitoring the user's progress and receiving user reviews of the study plan. The system is trained by the initial and additional inputs to iteratively adjust its recommendations to fit the needs of the user as well as provide improved study plans to future users.

The system functions in different embodiments as a server-based or cloud-based solution, an application programming interface (API), or an application that executes at least partially on a user's device.

In some embodiments, users of the system include students that want to consume a study plan, experts and mentors that want to generate and refine plans for the users, and managers that want to designate study plans for their subordinates and monitor their progress. The system includes an AI agent that generates dynamic, smart, and personalized study plans based on the user profile and the user's desired topics to learn. The AI agent improves the function of online learning computer systems by employing collaborative filtering in some embodiments, based on profiles, feedback, and progress and knowledge monitoring from multiple users, to provide intelligent recommendations for learning resources. This provides more accurate and useful results.

The system also provides in some embodiments various tools for team managers and leaders. These tools allow development of different strategies and study plans for different users (e.g., on their team) who are studying the same topic, as well as progress and feedback monitoring. Rating of study plans by users provides a measure of competition between plan creators, as well as sharing, reuse, and improvement of study plans. Users, mentors, and managers can copy, share, and change already created study plans, and users and managers alike can review customized plans with the help of the AI agent.

The system includes a number of components that each may be implemented on a server or on an end-user device. In some cases, a subset of the components may execute on a user device (e.g., a mobile application on a cell phone, a webpage running within a web browser, a local application executing on a personal computer, etc.) and another subset of the components may execute on a server (a physical machine, virtual machine, or container, etc., which may be located at a datacenter, a cloud computing provider, a local area network, etc.).

The components of the system may be implemented in some embodiments as software programs or modules, which are described in more detail below. In other embodiments, some or all of the components may be implemented in hardware, including in one or more signal processing and/or application specific integrated circuits. While the components are shown as separate components, two or more components may be integrated into a single component. Also, while many of the components' functions are described as being performed by one component, the functions may be split among two or more separate components.

FIG. 1 illustrates a sample study plan 100 of some embodiments. The sample study plan 100 has a unique identifier 105 assigned by the system, in order to distinguish this particular plan from other study plans in the system. In this example, the sample study plan 100 has four resources 111 to 114, each of which is associated with a main topic (in this case, the programming language Python). For visualization, these resources are represented in FIG. 1 as rows in the sample study plan 100. Other study plans in the system may have any number of resources, ranging from at least one to potentially dozens or even hundreds.

Each resource 111 to 114 in the sample study plan 100 has a number of components (e.g., fields) that describe various metadata associated with that resource. These typically include a descriptor 120, a locator 122, a resource type 125, a duration 130, and a list of one or more resource topics 135, though in some embodiments one or more of these may be omitted. Additional components that describe additional metadata pertaining to each resource may also be included in some embodiments, such as a user rating, an aggregate progression status, an aggregate similarity, and price (and/or a flag indicating whether the resource is free), which are not shown in FIG. 1. The study plan and meta data may be associated with each other and stored in a data record. It is not necessary for all resources have all the same components, as some resources may have more components and other resources may have fewer. For visualization, the components are represented in FIG. 1 as columns in the sample study plan 100.

As an example, aggregate progression status could be defined as the progression status of a resource from each user (e.g., based on progression monitoring, such as a progress report 410 discussed below with reference to FIG. 4), aggregated over all users. Aggregate similarity could be defined as the similarity of the resource to other resources from each user (e.g., based on their ratings and feedback, such as a review 310 discussed below with reference to FIG. 3), aggregated over all users. Aggregation of these and other metadata for each resource may be performed by quantifying these metrics and taking an average of the quantified metrics in some embodiments.

The descriptor 120 in some embodiments includes at least the resource's name, and may also include a brief description or summary. For example, if the resource is a video series, then the descriptor 120 is the name of the series, and optionally may also include the title of the video in that series. For example, resources 111 and 112 are two videos in a series titled Python 101, where resource 111 is a video in that series titled "Basics of Syntax", and resource 112 is a video in that series titled "If and Then". Resource 113 is a chapter of a textbook, so the descriptor 120 is a combination of the book title ("Python Complete") and the chapter number and title ("Chapter 4, Introduction to OOP"). Resource 114 is a blog post, so the descriptor 120 is the title of the blog post.

The locator 122 is the actual location of the resource. Examples of such locations include reference to a location on the Internet (e.g., a uniform resource locator, or URL), a file transfer protocol (FTP) address to a server, an international standard book number (ISBN), a digital object identifier (DOI), etc. These examples require the user to retrieve the resource from an external source. For example, resources 111, 112, and 114 are all resources on the Internet (videos and a blog post), and so the locator 122 for these are URLs. Resource 113 is a chapter of a textbook, so the locator is an ISBN number, which requires the user to go to a library to checkout. Though not as convenient as a link, some textbooks have copyright restrictions that do not allow their contents to be reproduced publicly.

The locator 122 is not limited to external address locations. In some embodiments the locator 122 is an address to a local storage location internal to the system, which can be used by the used to immediately access the resource. In other embodiments, the locator 122 is a digital copy of the resource itself, which is embedded into the study plan when the study plan is provided to the user, requiring no further retrieval.

The resource type 125 indicates the type of the resource. This is useful since some users learn more effectively from certain types of media than others. A wide variety of media types may be supported by the system, including but not limited to documents, books, e-books, articles, blog posts, online courses (both paid and free), guides, tutorials, videos, images, and assessments (e.g., quizzes and tests, both online and offline). In the example of FIG. 1, resources 111 and 112 are both videos in an online series, resource 113 is a textbook chapter, and resource 114 is a blog post by an expert in the field.

The duration 130 indicates the expected time for the user to finish consuming the resource. For example, resources 111 and 112, the duration is the run time of each video, 90 minutes, and 45 minutes, respectively. For resource 113, the duration is a week, which is the expected time for a student to read the chapter and complete any assignments and exercises therein. For resource 114, the duration is the time it would take to read the blog post.

The resource topic 135 indicates the topics that are associated with the resource. Generally, all the resources in a study plan have at least one topic in common. For example, in the sample study plan 100, all the resources pertain to the Python programming language, so all the resources have the topic "Python." In some embodiments, this common topic is referred to as the plan topic.

However, each of the resources 111-114 also have additional topics that are specific to the resource. In some embodiments, these additional resource topics are referred to as the plan subtopics. For example, resources 111 and 112 are both part of the same video series on Python, but have different resource topics, namely basic syntax, and the use of conditionals. Resource 113 is a textbook chapter with a focus on object-oriented programming (OOP), and resource 114 is devoted to using Python for data science. Some resource topics may be assigned by an editor, and other resource topics may be automatically determined by keyword analysis or other analysis of the content of the resource. In some embodiments, additional resource topics may be specified by user feedback and other classification systems that are unique to the resource type, for example tags applied to blog posts, keywords assigned by indexing systems, etc.

FIG. 2 illustrates a use case scenario 200 in some embodiments. In this scenario, a human agent 205 provides an electronic profile 210 of user info to the AI agent 215, which uses that profile to generate a study plan 220 personalized to the user. For example, the human agent 205 may be the user themselves (e.g., the student), or may be the user's mentor, manager, etc.

The user's profile 210 defines one or more topics of desired study, and additional data such as the user's prior knowledge and skill set, knowledge domains and desired skills, preferences for types of media learning, and other preferences. In some embodiments, the AI agent 215 uses this information to select a study plan template from a library of study plans (not shown in FIG. 2) associated with the topics. The AI agent 215 further uses the information to modify the template by adding, removing, and/or substituting resources from the selected plan template. For example, the user's profile 210 may specify the user's preferences on the balance of theory vs. practice, strict deadlines vs. flexible deadlines, the level of detail desired on the topics, etc. The AI agent 215 uses these preferences in selecting resources with which to modify the template and generate the personalized study plan 220. The personalized study plan 220 is then provided to the human agent 205.

Figure 3:
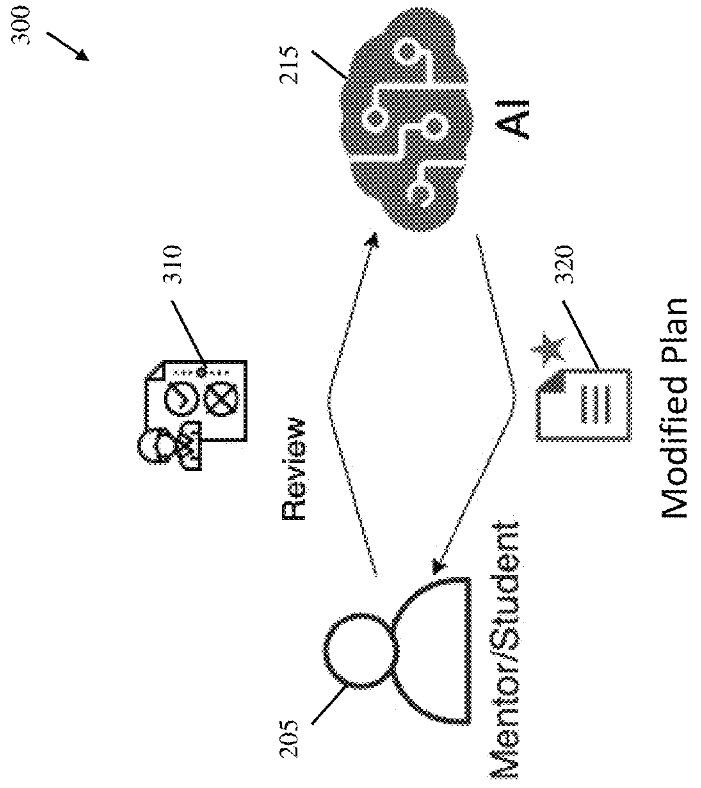
FIG. 3 illustrates another use case scenario 300 of the system in some embodiments.

FIG. 3 illustrates another use case scenario 300 in some embodiments. In this scenario, the human agent 205 provides electronic feedback, for example in the form of a review 310, of a study plan. The study plan could be the personalized study plan 220 that was provided under the first use case scenario 200, or another study plan that was not generated by the AI agent 215. The review could include, for example, a rating of each resource in the personalized study plan 220. The rating could be a numeric score or a simple binary selection, e.g. like/dislike. The feedback may also include new resources that the user desires to utilize which were not previously known to the AI agent 215, or which were known but not initially provided to the user. The AI agent 215 then uses the review 310 along with the previously-received user profile 210 (not shown in FIG. 3) to select resources with which to modify the selected template, and generate an improved study plan 320. The AI agent 215 keeps what the user liked, changes what the user disliked, and selects new resources more likely to be approved based on the similarity of other resources to the liked ones. For example, the AI agent 215 may use ratings from other users of the other available resources associated with the desired topics, an aggregate similarity of the liked resources to those other resources, and additional metadata compiled from user feedback in other profiles, in order to suggest the most likely alternative resources to be approved by the user. The improved study plan 320 is then provided to the human agent 205.

Figure 4:
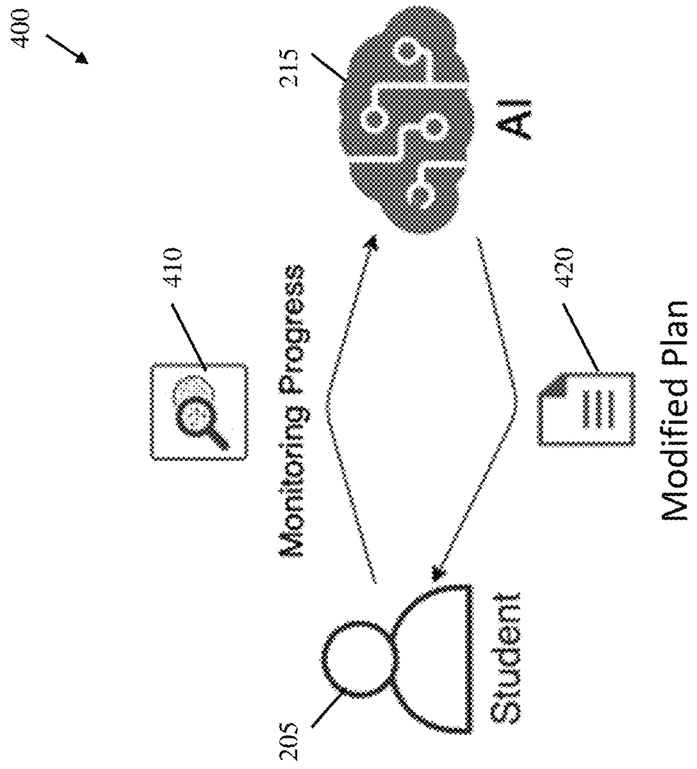
FIG. 4 illustrates another use case scenario 400 of the system in some embodiments.

FIG. 4 illustrates another use case scenario 400 in some embodiments. In this scenario, the human agent 205 provides an electronic progress report 410 of a study plan. The study plan could be a personalized study plan 220 that was provided under the first use case scenario 200, an improved study plan 320, or another study plan that was not generated by the AI agent 215. The progress report 410 includes, for example, metrics on how quickly the user is completing each resource in the study plan, as absolute measurements of time and/or relative to the specified duration 130. If the user is completing a resource too fast, then that resource may not be challenging enough, and if the user is too slow, then that resource may be too difficult. The AI agent 215 then uses the progress report 410 along with the previously-received user profile 210 (not shown in FIG. 3) to select resources with which to modify the selected template, and generate an improved study plan 420.

In some embodiments, the feedback use case 300 and the progress monitoring use case 400 may be combined, or occur in parallel. The AI agent 215 may use any review 310 or progress report 405 it receives, or both, to continually generate refined study plans for the user upon demand. In some embodiments, the AI agent 215 proactively sends alerts and reminders, to request the review 310 and/or the progress report 405 on a periodic basis. Alternatively, or conjunctively, the AI agent 215 may receive automated and/or periodic indicators of the user's progress, such as every time the user completes a resource or a portion of a resource. These feedback mechanisms may also be used to generate an initial personalized study plan 220 for a new user, by using progress reports and reviews that were received for other users regarding study plans on the same or similar topics.

In some embodiments, the user's mentor e.g., a teacher, a manager) can create plans and use the AI agent 215 to refine them with the optimization processes described above with reference to FIGS. 3 and 4. This allows the mentor to start with generic and/or previously created plans and personalize them to each student on an individual basis. With progress and feedback monitoring, the mentor can supervise the learning path of his students, applying changes as needed or desired by the mentor and/or the student.

Figure 5:
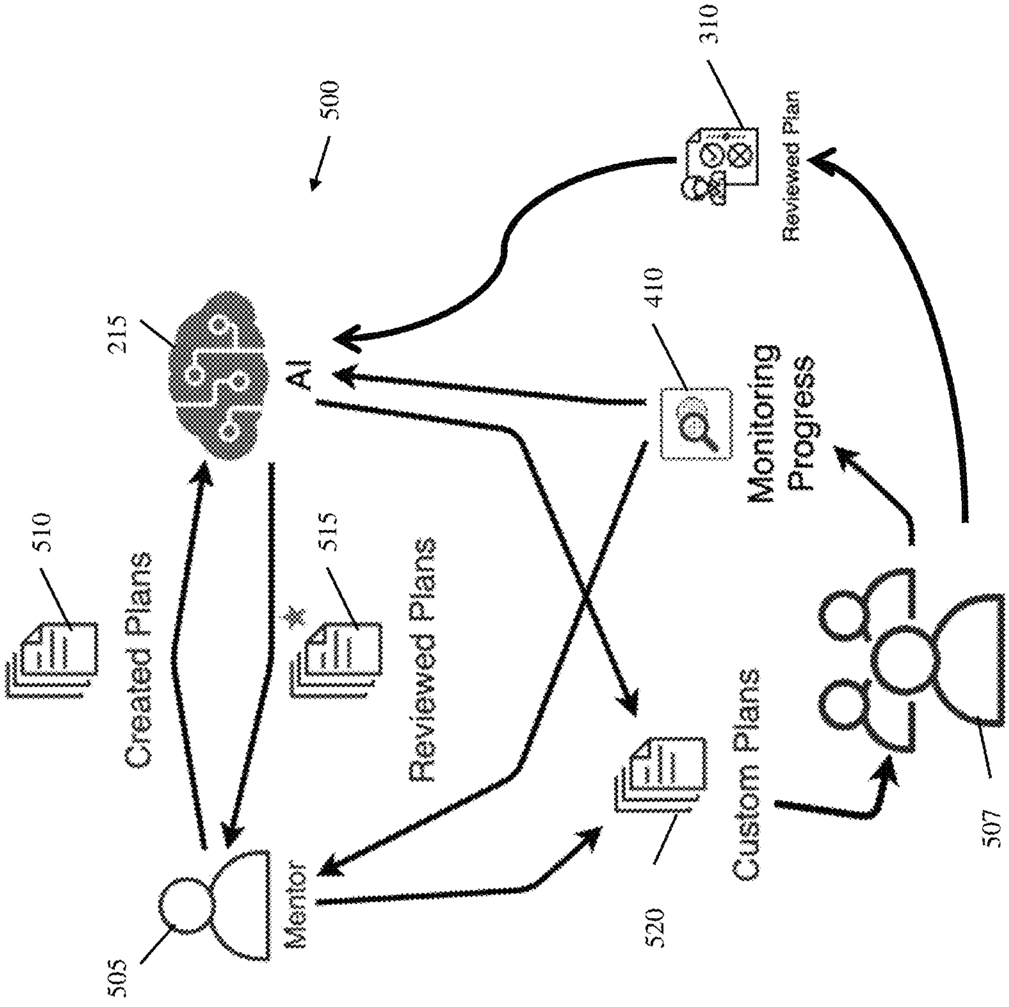
FIG. 5 illustrates a use case scenario 500 in which a human agent 505 refines plans for a number of users 507.

For example, FIG. 5 illustrates a use case scenario 500 in which a human agent 505 refines plans for a number of users 507. In this use case, the human agent 505 may be a mentor, a teacher, a manager, etc. and the users may be students, customers, employees, etc. The human agent 505 provides an initial set of plans 510 to the AI agent 215, which may have been previously generated by the AI agent 215, or otherwise created or obtained by the human agent 505. The AI agent 215 modifies the provided plans 510, using previous progress reports and reviews from other users, to select alternative resources, remove resources, and add resources, and creates new reviewed plans 515. The AI agent 215 provides the reviewed plans 515 back to the human agent 505. Note that these reviewed plans 515 do not necessarily have customizations based on a profile 210 of one or more of the users 507. If the AI Agent 215 receives a profile 210 (not shown in FIG. 5) of one or more of the users 507, then that information can also be used to customize the reviewed plans 515 to the users 507.

In some embodiments, the human agent 505 and/or the AI agent 215 can also modify the reviewed plans 515 to customize them for the users 507. For example, if the AI agent 215 receives (e.g., from the human agent 505, or from the users 507, or from local storage) a profile 210 of one or more of the users 507 after it has already generated the reviewed plans 515, it can use the reviewed plans 515 and the profile(s) 210 to generate a new set of customized plans 520 that are customized to the users 507 and provided to the users 507 directly or via the human agent 505.

Alternatively, or conjunctively, the human agent 505 may also customize the reviewed plans 515, to generate custom plans 520. The human agent 505 may use a profile 210 or any other information that they have regarding the users 507 capabilities, interests, and performance, as well as other priorities such as curriculum and training objectives, to modify the plans. The human agent 505 may modify the reviewed plans 515 or the customized plans 520 from the AI agent 215.

After providing the customized plans 520 to the users 507, one or more of the users 507 may provide a review 310 and/or progress report 405 to the AI agent 215. The AI agent 215 uses the review 310 and/or progress report 405 to again refine the plans for that group of users 507, as well as provide future reviewed plans 515 for other groups of users.

In some embodiments, the AI agent 215 is able to create custom plans by learning from provided plans. The AI agent 215 can start creating custom plans directly. This is a learning process with training, until the AI agent 215 creates plans that are as good as the human agent 505 plans. The plans created by the AI agent 215 also benefit from the optimization and refinement process.

Figure 6:
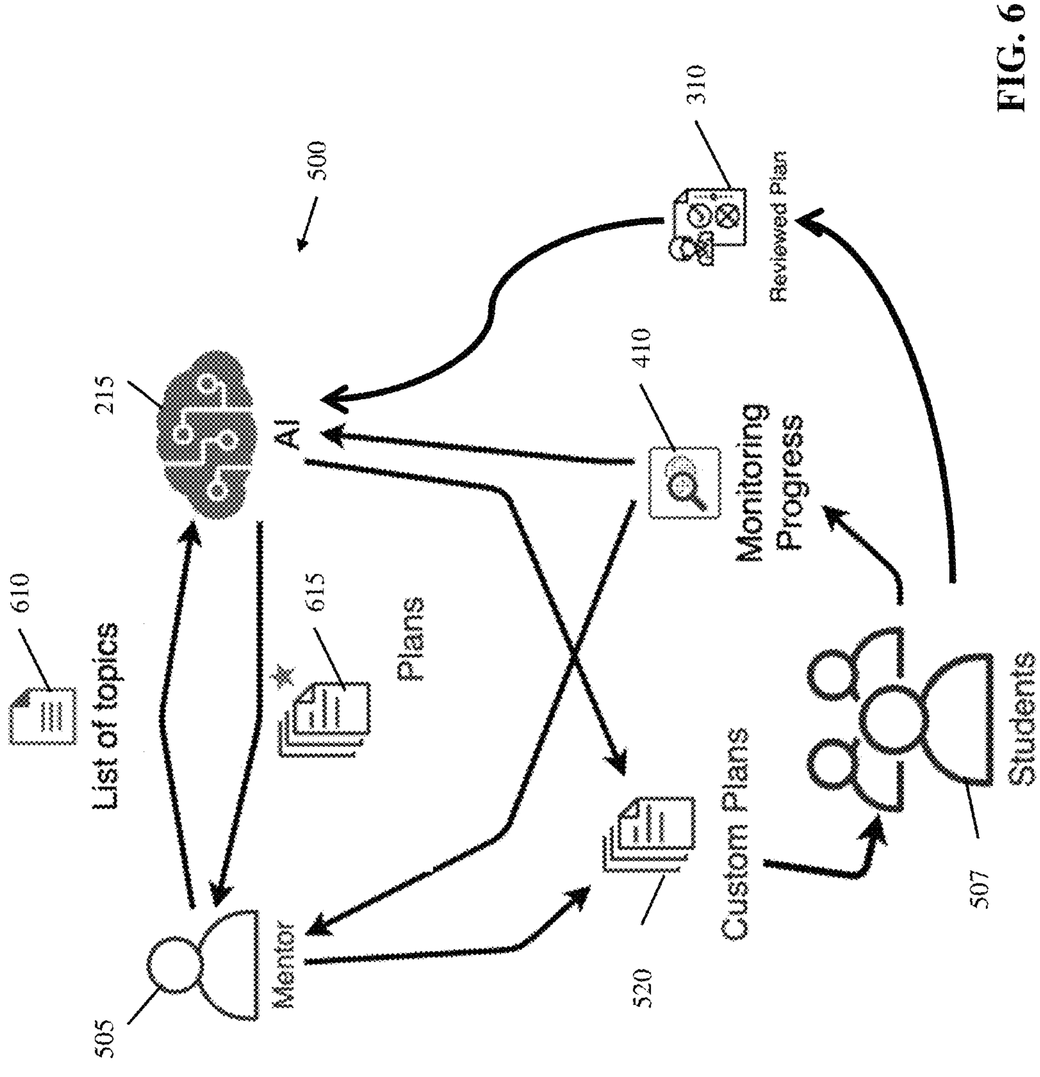
FIG. 6 illustrates a use case scenario 600 in which a human agent 505 only needs to define a list of topics 610 to the AI agent 215 instead of an initial set of plans 510.

FIG. 6 illustrates a use case scenario 600 in which a human agent 505 only needs to define a list of topics 610 to the AI agent 215 instead of an initial set of plans 510. The AI agent 215 uses the list of topics 610 to generate a set of initial plans 615. These plans may then also be reviewed, refined, and customized in the same manner as discussed above with respect to FIGS. 3, 4, and 5.

Figure 7:
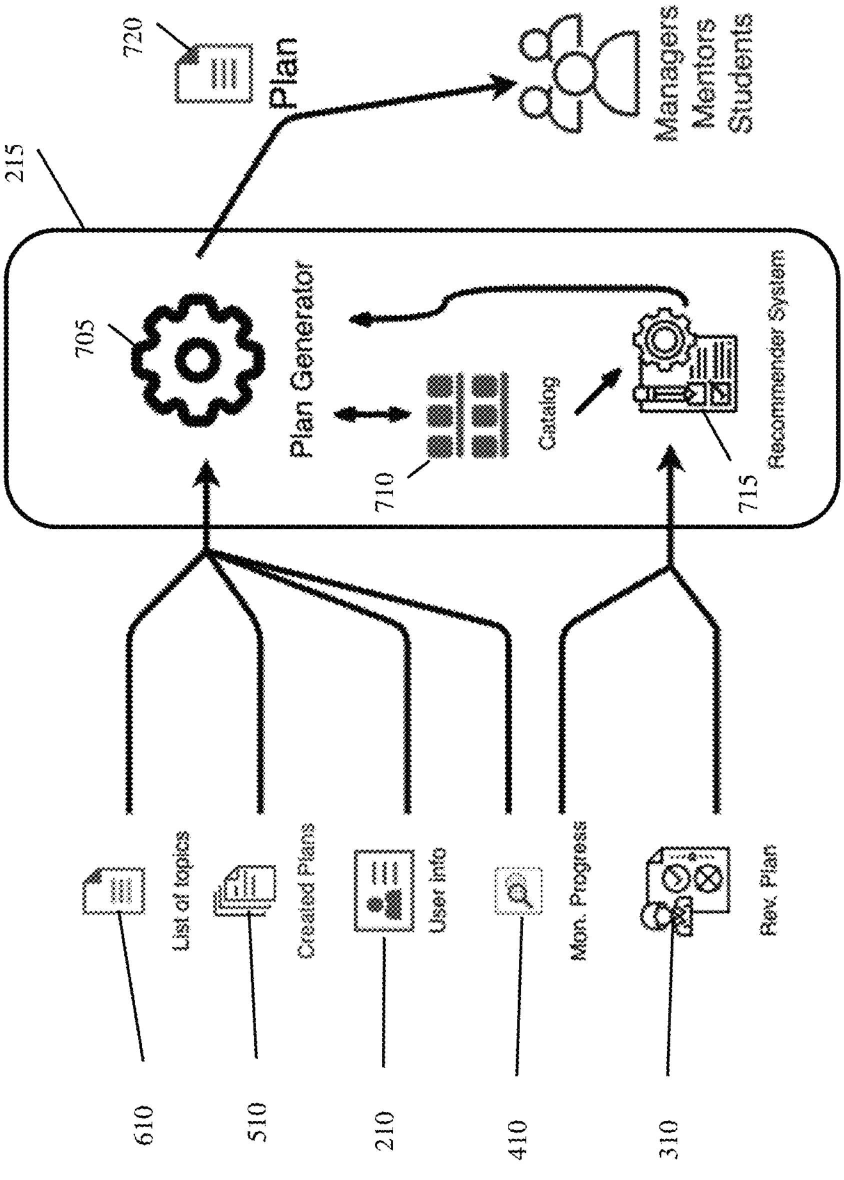
FIG. 7 conceptually illustrates some components of the AI agent 215 in some embodiments.

FIG. 7 conceptually illustrates some components of the AI agent 215 in some embodiments. The AI agent 215, also referred to as an AI engine or an AI module, includes a plan generator 705, a catalog 710 of resources and plans, and a recommender system 715.

The catalog 710 provides all learning content needed to compose the plan and feed the recommender system 715. The catalog 710 includes individual resources, as well as plan templates and customized and modified plans. The plans and resources in the catalog 710 may be indexed by any of the available metadata, such as by topic. In addition, the catalog 710 also may include templates of plans for topics, which can be used and modified to generate new plans and custom plans.

Figure 8:
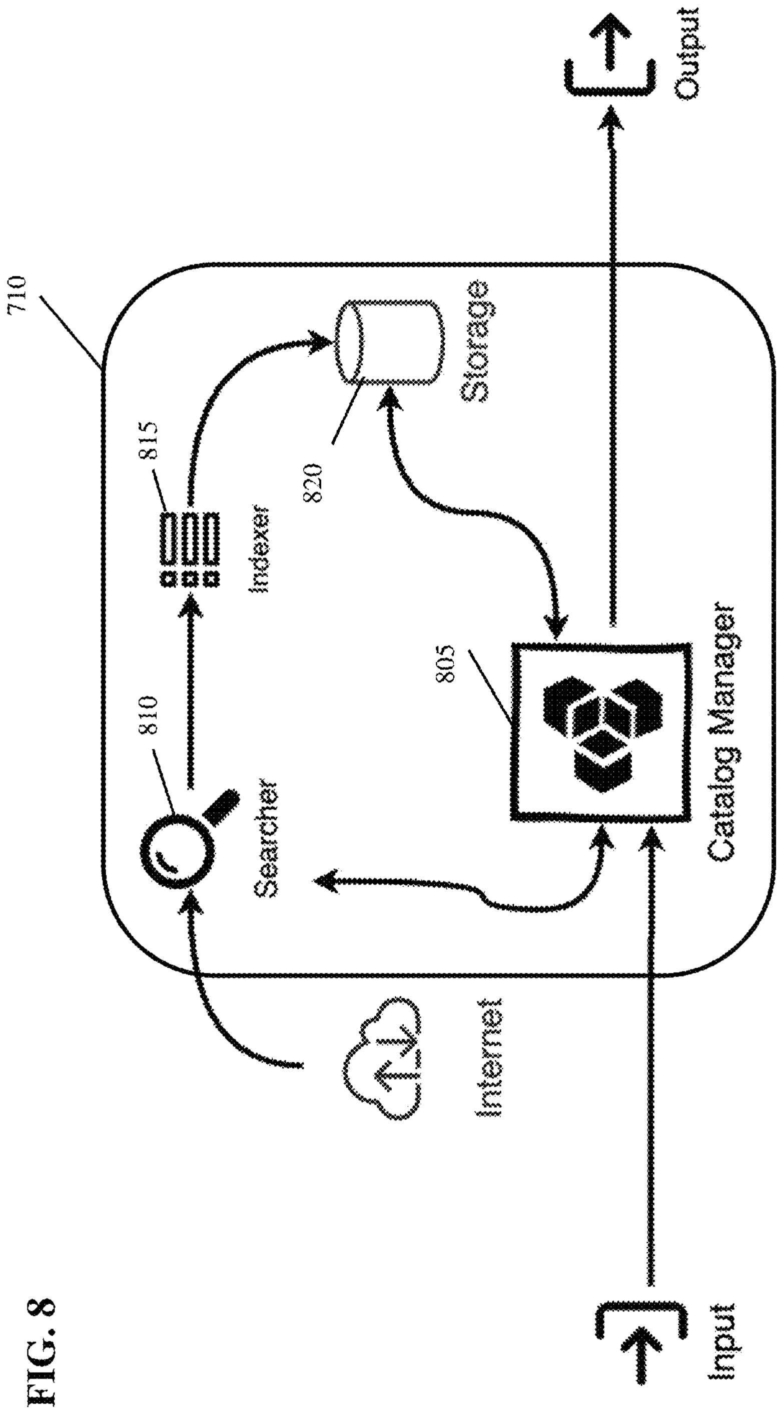
FIG. 8 conceptually illustrates some components of the catalog 710 of some embodiments.

FIG. 8 conceptually illustrates some components of the catalog 710 of some embodiments. For example, the catalog 710 includes a catalog manager 805 that manages and indexes the learning resources/plans, receives as input new resources/plans, and provides resources/plans as output the plan generator 705 and the recommender system 715. The catalog 710 also includes a searcher 810, that connects to the Internet to retrieve requested learning resources that may not be locally available, or which may be defined in existing plans as new resources to include and/or by user suggestions in feedback. An indexer 815 indexes the resources that are retrieved by the searcher 810 and generates metadata (not shown in FIG. 8) about these retrieved learning resources. The metadata is stored in a storage 820, which is accessed by the catalog manager 805 in order to provide the requested resources and plans as output in a faster and more efficient manner than prior systems.

Figure 9:
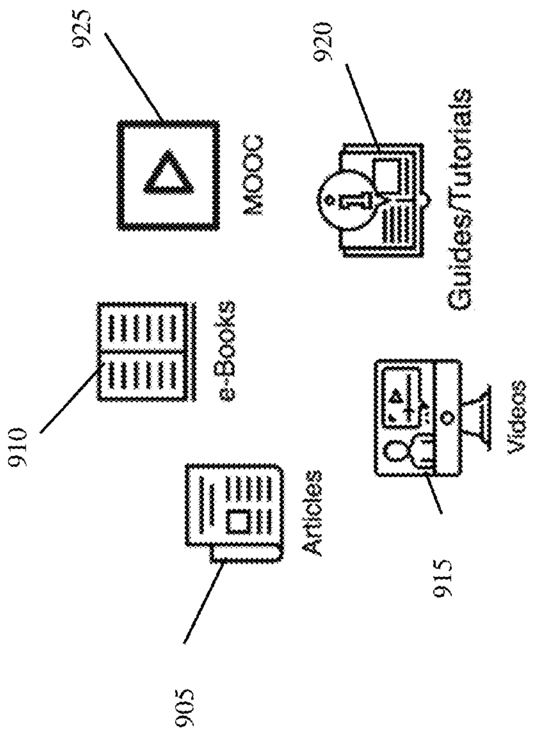
FIG. 9 conceptually illustrates just a few of the many different types of resources that are available for retrieval from the Internet by the searcher 810 of the catalog 710.

FIG. 9 conceptually illustrates just a few of the many different types of resources that are available for retrieval from the Internet by the searcher 810 of the catalog 710. These include articles 905, e-books 910, videos 915 from online video websites and streaming services, guides and tutorials 920, and massively-open online courses (MOOC) 925. Any or all of these resources may be publicly available, available on a per-use basis, or available by a paid account (either personal or enterprise) on a service. Examples of e-Books include open, free, and paid versions. Examples of articles include open journals and free articles, paid articles, articles on websites and blogs, and articles from scientific and technical conferences and journals.

Returning to FIG. 7, the plan generator 705 collects information and data from the user, and returns the optimized study plan 720. For example, the plan generator 705 receives as input one or more of a list of topics 610, created plans 510, user profiles 210, and progress reports 410. The plan generator 705 uses these inputs to select resources and plans from the catalog 710 to generate or modify a new plan 720.

The recommender system 715 provides ratings for learning resources and performs collaborative filtering based on recommendations from other users and other metadata associated with the resources and plans in the catalog 710 (including but not limited to user ratings, aggregate progression status, aggregate similarity, and price). For example, the recommender system 715 receives one or more progress reports 410 and reviews 310 as inputs. The recommender system 715 uses these inputs to retrieve resources and/or plans from the catalog 710 and filter and rank them. The recommender system 715 provides the filtered resources/ plans and rankings to the plan generator 705 to modify the selected resources/plans that the plan generator 705 uses to generate the new plan 720.

Figure 10:
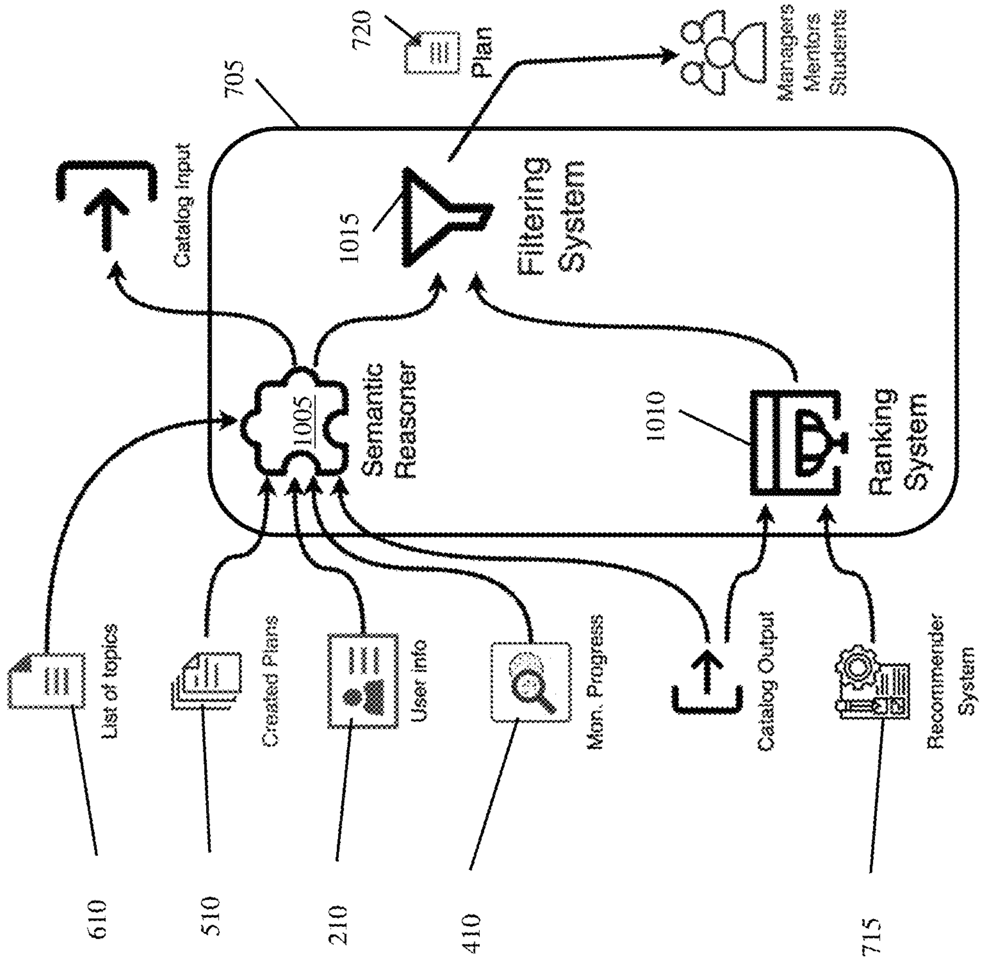
FIG. 10 conceptually illustrates some components of the plan generator 705 in some embodiments.

FIG. 10 conceptually illustrates some components of the plan generator 705 in some embodiments. The plan generator 705 includes one or more of a semantic reasoner 1005, a ranking system 1010, and a filtering system 1015. In some embodiments, the ranking system 1010 and the filtering system 1015 are separate components of the plan generator 705, and in other embodiments the ranking system 1010 and the filtering system 1015 are part of a single component.

The semantic reasoner 1005 generates one or multiple plans considering all information like specifications, limitations, topics, and deadlines, using logical programming, to ensure that the plans have what the user requires. In some embodiments, the semantic reasoner 1005 receives as input one or more of a list of topics 610, created plans 510, user profiles 210, and progress reports 410, as well as resources and plans from the catalog 710. The semantic reasoner 1005 outputs the generated plans to the filtering system 1015, and also updates the catalog 710 (e.g., updates metadata associated with resources and plans stored therein).

In some embodiments, the semantic reasoner 1005 generates every possible plan for every possible user, and then the filtering system 1015 filters out the plans that are not needed based on topic and user. The semantic reasoner 1005 could generate the plans on a semi-regular basis (e.g., daily, weekly, etc.) as a batch process using all available information received. Alternatively, or conjunctively, the semantic reasoner 1005 could perform real-time plan creation based on the current inputs.

The ranking system 1010 provides a score for each learning resource and plan in the catalog 710 based on information received from the recommender system 715. In some embodiments, the ranking system 1010 uses a machine learning system such as a neural network to provide the scores. Different types of such neural networks include feed-forward networks, convolutional networks, recurrent networks, regulatory feedback networks, radial basis function networks, long-short term memory (LSTM) networks, and Neural Turing Machines (NTM). See He, Kaiming, Zhang, Xiangyu, Ren, Shaoqing, and Sun, Jian, "Deep Residual Learning for Image Recognition," arXiv preprint arXiv: 1512.03385, 2015, incorporated herein by reference.

The filtering system 1015 uses the score for each plan from the ranking system 1010 and returns an ordered set of plans according to the user preferences (e.g., as specified in the user profile 210). The plan generator 705 uses the ordered set of plans to select the plan 720 to provide to the user.

Figure 11:
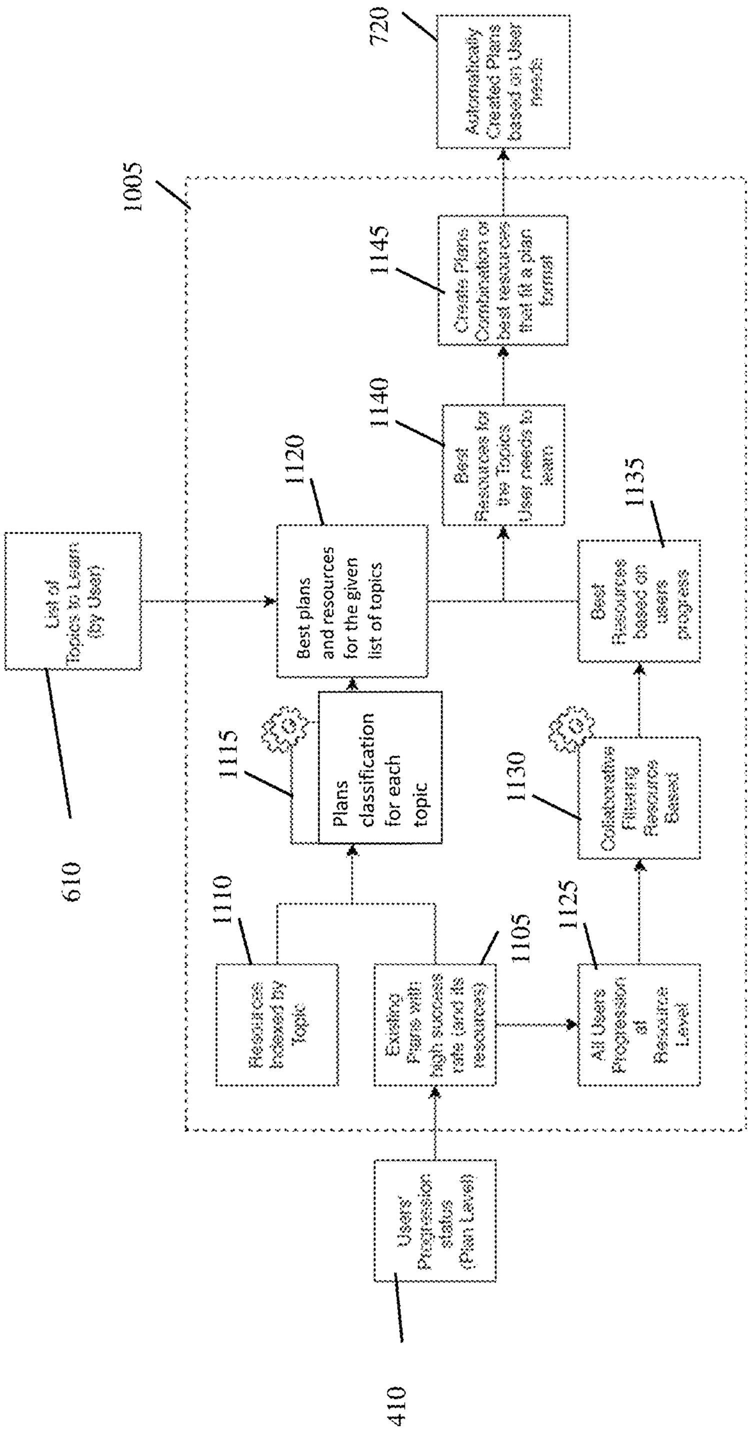
FIG. 11 conceptually illustrates the semantic reasoner 1005 of some embodiments.

FIG. 11 conceptually illustrates the semantic reasoner 1005 of some embodiments. As noted above, the semantic reasoner 1005 uses the list of topics 610 and the users' progression status (e.g. progress reports 410) to automatically create plans 720 based on the users' needs. The semantic reasoner 1005 uses the progress reports 410 to select existing plans 1105 from the catalog 710 with a high success rate. The resources in these existing plans 1105 are also selected automatically in some embodiments. In addition, the semantic reasoner 1005 also selects resources 1110 from the catalog 710 based on the list of topics 610, since the resources are indexed by topic.

Figure 12:
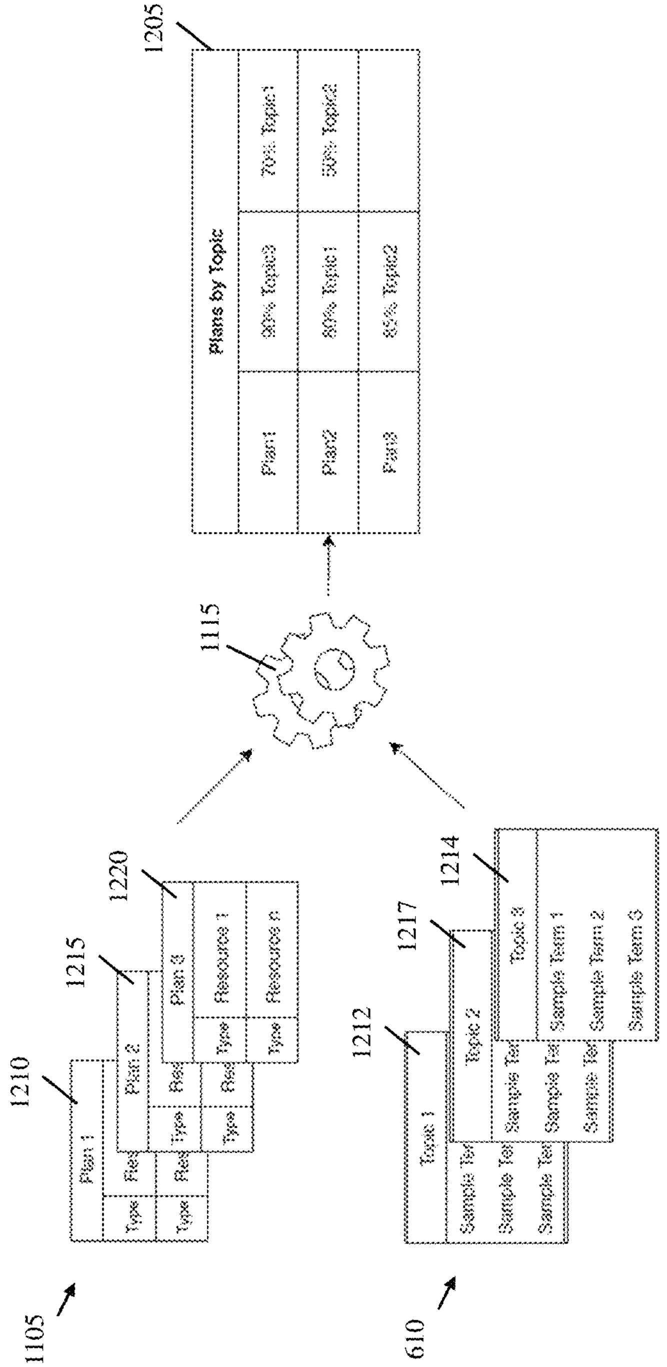
FIG. 12 conceptually illustrates how in some embodiments, the topic modeler 1115 uses a topic model to determine the best plans and resources 1120 for learning a given list of topics 610.

The semantic reasoner 1005 includes in some embodiments a topic modeler 1115, which uses the selected existing plans 1105 and the selected resources 1110 to determine which are the best plans and resources 1120 to use for learning, for the given list of topics 610. FIG. 12 conceptually illustrates how in some embodiments, the topic modeler 1115 uses a topic model to determine the best plans and resources 1120 for learning a given list of topics 610.

In machine learning and natural language processing, a topic model is a type of statistical model for discovering the abstract "topics" that occur in a collection of documents. Topic modeling is a frequently used text-mining tool for discovery of hidden semantic structures in a text body. Intuitively, given that a document is about a particular topic, one would expect particular words to appear in the document more or less frequently: "dog" and "bone" will appear more often in documents about dogs, "cat" and "meow" will appear in documents about cats, and "the" and "is" will appear approximately equally in both. A document typically concerns multiple topics in different proportions; thus, in a document that is 10% about cats and 90% about dogs, there would probably be about 9 times more dog words than cat words. The "topics" produced by topic modeling techniques are clusters of similar words. A topic model captures this intuition in a mathematical framework, which allows examining a set of documents and discovering, based on the statistics of the words in each, what the topics might be and what each document's balance of topics is. In other words, the topic model describes the aggregate similarity of each resource and plan to every other resource and plan, based on the analysis of keywords and resulting inference of the topics.

For example, in FIG. 12 each of the topics in the list of topics 610 has one or more sample terms that are associated with that topic. The sample terms are defined by analyzing all the resources in the catalog 710 (e.g., as a periodic update), or only the selected resources 1110 relevant to the topics 610. The topic modeler 1115 then generates a topic model 1205 which associates each plan 1105 with the topics. In the example shown, the topic model 1205 determines that Plan 1 1210 is 70% relevant to topic 1 1212, and 90% relevant to topic 3 1214. Plan 2 1215 is 80% relevant to topic 1 1212, and 50% relevant to topic 2 1217. Plan 3 1220 is 85% relevant to topic 2 1217. This percentage relevance is only one of many possible ways in which each plan can be associated with topics. In some embodiments, for example, a plan may be associated in binary fashion (yes or no) to each topic.

Figure 13:
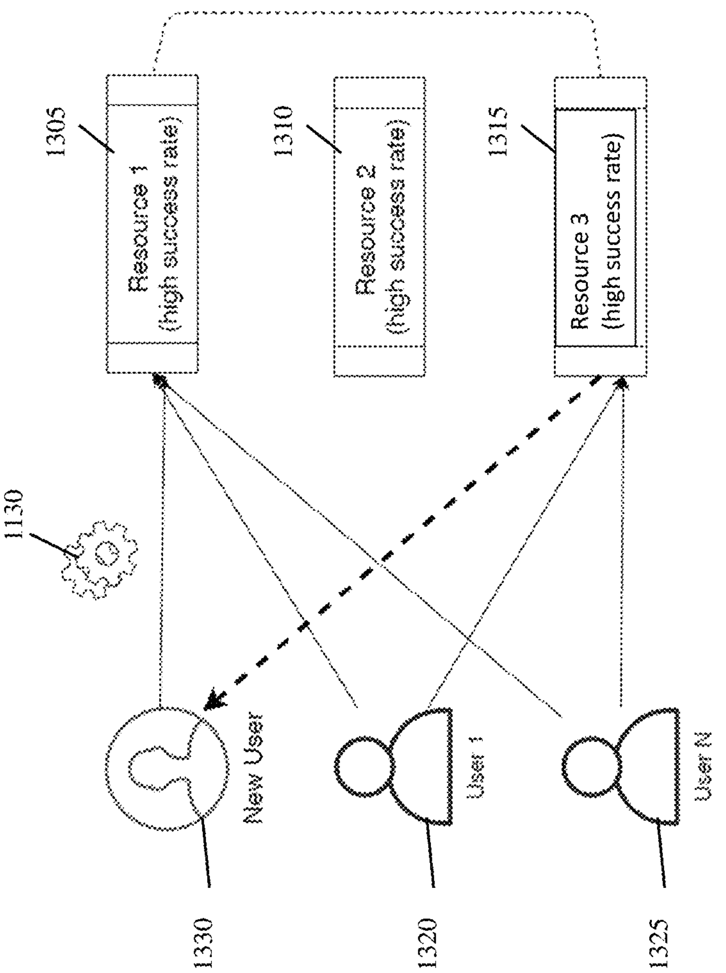
FIG. 13 conceptually illustrates how in some embodiments, the filter engine 1130 uses collaborative filtering to determine the best plans and resources 1135 based on the users' progress.

Returning to FIG. 11, the semantic reasoner 1005 also uses the progress reports 410 to determine the aggregate progression 1125 of all users for each resource. The semantic reasoner 1005 includes in some embodiments a filter engine 1130, which uses the aggregate progression 1125 to determine which are the best plans and resources 1135 to use for learning, based on the users' progress. FIG. 13 conceptually illustrates how in some embodiments, the filter engine 1130 uses collaborative filtering to determine the best plans and resources 1135 based on the users' progress.

Collaborative filtering is a method of making automatic predictions (filtering) about the interests of a user by collecting preferences or taste information from many users (collaborating, e.g. by crowdsourcing). The underlying assumption of the collaborative filtering approach is that if a person A has the same opinion as a person B on an issue, A is more likely to have B's opinion on a different issue than that of a randomly chosen person. For example, a collaborative filtering recommendation system for preferences in television programming could make predictions about which television show a user should like given a partial list of that user's tastes (likes or dislikes). Note that these predictions are specific to the user, but use information gleaned from many users. This differs from the simpler approach of giving an average (non-specific) score for each item of interest, for example based on its number of votes.

In the example of FIG. 13, resource 1 1305, resource 2 1310, and resource 3 1315 are available for a given topic. User 1 1320 and user 2 1325 both have completed resource 1 1305 and resource 3 1315 at a high success rate. However, neither of these users have completed resource 2 1310, even though resource 2 1310 is on the same topic and also has a high success rate for other users. New user 1330 is determined to have similar preferences as user 1 1320 and user 2 1325, for example based on an analysis of their corresponding user profiles, feedback, and progress reports. As a result, the filter engine 1130 recommends resource 1 1305 and resource 3 1315 to the new user 1330 and does not recommend resource 2 1310.

Returning to FIG. 11, the semantic reasoner 1005 uses the best plans and resources 1120 for the given list of topics 610, and the best resources 1135 based on aggregate user progress, to determine the best resources 1140 for the topics 610 that are best tailored to the users. In other words, the topic modeler 1115 determines the best plans and resources 1120 for the topics (using topic modeling), the filter engine 1130 determines the best resources 1135 for the users (using collaborative filtering), and the semantic reasoner 1005 combines these into the best resources 1140 for the topic, for the users. The semantic reasoner 1005 then creates combinations of the best resources 1140 and uses these to create a group of plans 1145 for the user. These plans 1145 are then filtered by the filtering system 1015 as described above to select the optimum plan 720.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
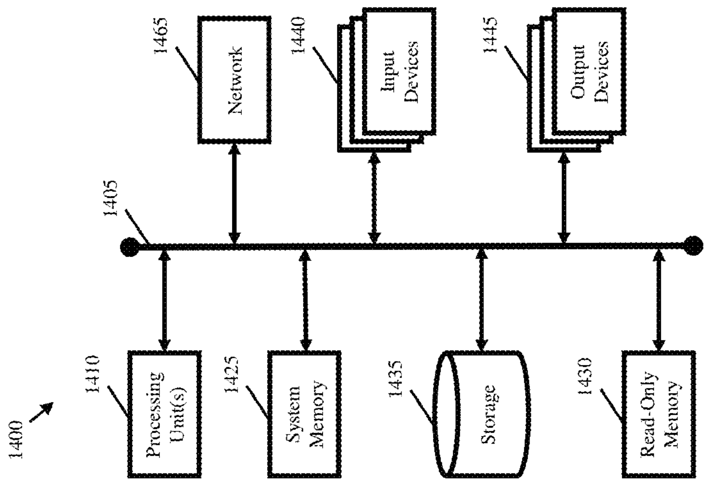
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control and/or compiler systems described above in some embodiments. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieves instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random-access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieves instructions to execute and data to process in order to execute the processes of some embodiments.

The bus 1405 also connects to the input devices 1440 and output devices 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms “computer”, “server”, “processor”, and “memory” all refer to electronic or other technological devices. These terms exclude people or groups of people. For the purposes of the specification, the terms display or displaying means displaying on an electronic device. As used in this specification, the terms “computer readable medium,” “computer readable media,” and “machine readable medium” are entirely restricted to tangible, physical objects that store information in a form that is readable by a computer. These terms exclude any wireless signals, wired download signals, and any other ephemeral signals.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A system comprising:

one or more processors, coupled with memory, to:

establish at least one electronic connection with one or more network locations or storage addresses;

retrieve, using the at least one electronic connection, a plurality of digital resources from the one or more network locations or storage addresses;

generate an index comprising the plurality of digital resources retrieved from the one or more network locations or storage addresses, the index based on metadata indicative of a topic or corresponding subtopic associated with each of the plurality of digital resources;

store, in a memory structure, the index with a plurality of template objects associated with corresponding digital records;

receive, using an artificial intelligence model comprising a neural network, an input comprising: i) one or more topics or corresponding subtopics, and ii) an electronic profile comprising one or more preferences;

provide, using the neural network, responsive to the input, a ranking of the plurality of digital resources and the plurality of template objects based on scores generated for each of the plurality of digital resources and the plurality of template objects;

execute, using the artificial intelligence model, a collaborative filtering operation on the plurality of digital resources and the plurality of template objects, wherein to execute the collaborative filtering operation, the one or more processors:

identify a first portion of the plurality of digital resources or the plurality of template objects based on a correspondence between a plurality of preferences of additional electronic profiles and the one or more preferences of the electronic profile;

generate, using the artificial intelligence model, predictions of a second portion of the plurality of digital resources and the plurality of template objects based on the correspondence between the plurality of preferences of the additional electronic profiles and the one or more preferences of the electronic profile; and automatically filter, using the artificial intelligence model, the plurality of template objects and the plurality of digital resources to include the first portion and the second portion;

select, using the artificial intelligence model, from the memory structure, at least one template object of the plurality of template objects and a combination of the plurality of digital resources based on the ranking provided by the neural network;

generate, using the artificial intelligence model, a customized digital record in a data repository, the customized digital record configured for the electronic profile by modifying the at least one template object using the combination of the plurality of digital resources;

monitor at least one of feedback or a progression status associated with the customized digital record or the electronic profile;

transmit, to at least one computing device associated with the electronic profile, an alert signal associated with the feedback or the progression status; and iteratively modify, responsive to transmission of the alert signal to the at least one computing device, the customized digital record stored in the data repository based on the feedback or the progression status.

2. The system of claim 1, wherein the one or more processors further:

receive a plurality of status reports, each status report comprising at least one progression status associated with a corresponding digital record;

train, using the plurality of status reports, the artificial intelligence model to identify an aggregate progression status for each of the plurality of digital resources, resulting in a trained artificial intelligence model;

filter, using the trained artificial intelligence model, the plurality of digital resources to remove one or more of the plurality of digital resources based on the aggregate progression status for each of the plurality of digital resources; and generate the customized digital record based on the filtered plurality of digital resources.

3. The system of claim 2, wherein the one or more processors further:

identify the additional electronic profiles;

use the additional electronic profiles to further train the artificial intelligence model to identify an aggregate similarity for each of the plurality of digital resources, resulting in a further trained resource model;

use the further trained resource model to further filter the plurality of digital resources to remove additional digital resources based on the aggregate similarity for each of the plurality of digital resources; and generate the customized digital record based on the further filtered plurality of digital resources.

4. The system of claim 1, wherein the electronic profile is associated with a user, and wherein the user comprises a student.

5. The system of claim 1, wherein each of the plurality of digital resources comprises a reference to at least one media file, wherein each media file is one of a document, a book, an e-book, an article, a blog post, an online course, a guide, a tutorial, a video, an image, and an assessment.

6. The system of claim 1, wherein the artificial intelligence model is trained by identifying keywords in each digital resource of the plurality of template objects, wherein the artificial intelligence model assigns a relevance of each topic to the customized digital record based on a frequency of occurrence of each identified keyword, the relevance ranging from 0% to 100%, and wherein the at least one template object is selected based on the relevance of each topic.

7. The system of claim 2, wherein the one or more processors further:

receive, from the electronic profile, the feedback comprising a rating for at least one resource of the customized digital record;

remove additional digital resources from the customized digital record based on the rating;

identify, using the trained artificial intelligence model, replacement digital resources for the additional digital resources that were removed from the customized digital record; and modify the customized digital record based on the replacement digital resources.

8. The system of claim 2, wherein the one or more processors further:

receive a status report for at least one digital resource of the customized digital record;

remove additional digital resources from the customized digital record based on the status report;

identify, using the trained artificial intelligence model, identify replacement digital resources for the additional digital resources that were removed from the customized digital record; and modify the customized digital record based on the replacement digital resources.

9. The system of claim 1, wherein the customized digital record is generated based on one or more preference of the electronic profile, and wherein the one or more preferences comprise a deadline for completion associated with the one or more topics or the corresponding subtopics.

10. The system of claim 1, wherein the neural network comprises one or more feed-forward networks, convolutional networks, recurrent networks, regulatory feedback networks, radial basis function networks, long-short term memory (LSTM) networks, or Neural Turing Machines (NTM).

11. A method comprising:

establishing, by one or more processors, coupled with memory, at least one electronic connection with one or more network locations or storage addresses;

retrieving, by the one or more processors, using the at least one electronic connection, a plurality of digital resources from the one or more network locations or storage addresses;

generating, by the one or more processors, an index comprising the plurality of digital resources retrieved from the one or more network locations or storage addresses, the index based on metadata indicative of a topic or corresponding subtopic associated with each of the plurality of digital resources;

storing, by the one or more processors, in a memory structure, the index with a plurality of template objects associated with corresponding digital records;

receiving, by the one or more processors, using an artificial intelligence model comprising a neural network, an input comprising: i) one or more topics or corresponding subtopics, and ii) an electronic profile comprising one or more preferences;

providing, by the one or more processors, using the neural network, responsive to the input, a ranking of the plurality of digital resources and the plurality of template objects based on scores generated for each of the plurality of digital resources and the plurality of template objects;

executing, by the one or more processors, using the artificial intelligence model, a collaborative filtering operation on the plurality of digital resources and the plurality of template objects, wherein executing the collaborative filtering operation comprises:

identifying a first portion of the plurality of digital resources or the plurality of template objects based on a correspondence between a plurality of preferences of additional electronic profiles and the one or more preferences of the electronic profile;

generating, using the artificial intelligence model, predictions of a second portion of the plurality of digital resources and the plurality of template objects based on the correspondence between the plurality of preferences of the additional electronic profiles and the one or more preferences of the electronic profile; and automatically filtering, using the artificial intelligence model, the plurality of template objects and the plurality of digital resources to include the first portion and the second portion;

selecting, by the one or more processors, using the artificial intelligence model, from the memory structure, at least one template object of the plurality of template objects and a combination of the plurality of digital resources based on the ranking provided by the neural network;

generating, by the one or more processors, using the artificial intelligence model, a customized digital record in a data repository, the customized digital record configured for the electronic profile by modifying the at least one template object using the combination of the plurality of digital resources;

monitoring, by the one or more processors, at least one of feedback or a progression status associated with the customized digital record or the electronic profile;

transmitting, by the one or more processors, to at least one computing device associated with the electronic profile, an alert signal associated with the feedback or the progression status; and iteratively modifying, by the one or more processors, responsive to transmission of the alert signal to the at least one computing device, the customized digital record stored in the data repository based on the feedback or the progression status.

12. The method of claim 11, further comprising:

receiving, by the one or more processors, a plurality of status reports, each status report comprising at least one progression status associated with a corresponding digital record;

training, by the one or more processors, using the plurality of status reports, the artificial intelligence model to identify an aggregate progression status for each of the plurality of digital resources, resulting in a trained artificial intelligence model;

filtering, by the one or more processors, using the trained artificial intelligence model, the plurality of digital resources to remove one or more of the plurality of digital resources based on the aggregate progression status for each of the plurality of digital resources; and generating, by the one or more processors, the customized digital record based on the filtered plurality of digital resources.

13. The method of claim 12, further comprising:

identifying, by the one or more processors, the additional electronic profiles;

using, by the one or more processors, the additional electronic profiles to further train the artificial intelligence model to identify an aggregate similarity for each of the plurality of digital resources, resulting in a further trained resource model;

using, by the one or more processors, the further trained resource model to further filter the plurality of digital resources to remove additional digital resources based on the aggregate similarity for each of the plurality of digital resources; and generating, by the one or more processors, the customized digital record based on the further filtered plurality of digital resources.

14. The method of claim 11, wherein the electronic profile is associated with a user, and wherein the user comprises a student.

15. The method of claim 11, wherein the electronic profile is associated with a user, and wherein the user comprises a mentor of a student.

16. The method of claim 11, wherein each of the plurality of digital resources comprises a reference to at least one media file, wherein each media file is one of a document, a book, an e-book, an article, a blog post, an online course, a guide, a tutorial, a video, an image, and an assessment.

17. The method of claim 11, wherein the artificial intelligence model is trained by identifying keywords in each digital resource of the plurality of template objects, wherein the artificial intelligence model assigns a relevance of each topic to the customized digital record based on a frequency of occurrence of each identified keyword, the relevance ranging from 0% to 100%, and wherein the at least one template object is selected based on the relevance of each topic.

18. The method of claim 12, further comprising:

receiving, by the one or more processors, from the electronic profile, the feedback comprising a rating for at least one resource of the customized digital record;

removing, by the one or more processors, additional digital resources from the customized digital record based on the rating;

identifying, by the one or more processors, using the trained artificial intelligence model, replacement digital resources for the additional digital resources that were removed from the customized digital record; and modifying, by the one or more processors, the customized digital record based on the replacement digital resources.

19. The method of claim 12, further comprising:

receiving, by the one or more processors, a status report for at least one digital resource of the customized digital record;

removing, by the one or more processors, additional digital resources from the customized digital record based on the status report;

identifying, by the one or more processors, using the trained artificial intelligence model, identify replacement digital resources for the additional digital resources that were removed from the customized digital record; and modifying, by the one or more processors, the customized digital record based on the replacement digital resources.

20. A non-transitory computer-readable storage medium (CRM) comprising one or more instructions stored thereon, the one or more instructions executable by one or more processors to:

establish at least one electronic connection with one or more network locations or storage addresses;

retrieve, using the at least one electronic connection, a plurality of digital resources from the one or more network locations or storage addresses;

generate an index comprising the plurality of digital resources retrieved from the one or more network locations or storage addresses, the index based on metadata indicative of a topic or corresponding subtopic associated with each of the plurality of digital resources;

store, in a memory structure, the index with a plurality of template objects associated with corresponding digital records;

receive, using an artificial intelligence model comprising a neural network, an input comprising: i) one or more topics or corresponding subtopics, and ii) an electronic profile comprising one or more preferences;

provide, using the neural network, responsive to the input, a ranking of the plurality of digital resources and the plurality of template objects based on scores generated for each of the plurality of digital resources and the plurality of template objects;

execute, using the artificial intelligence model, a collaborative filtering operation on the plurality of digital resources and the plurality of template objects, wherein to execute the collaborative filtering operation, the one or more processors:

identify a first portion of the plurality of digital resources or the plurality of template objects based on a correspondence between a plurality of preferences of additional electronic profiles and the one or more preferences of the electronic profile;

generate, using the artificial intelligence model, predictions of a second portion of the plurality of digital resources and the plurality of template objects based on the correspondence between the plurality of preferences of the additional electronic profiles and the one or more preferences of the electronic profile; and automatically filter, using the artificial intelligence model, the plurality of template objects and the plurality of digital resources to include the first portion and the second portion;

select, using the artificial intelligence model, from the memory structure, at least one template object of the plurality of template objects and a combination of the plurality of digital resources based on the ranking provided by the neural network;

generate, using the artificial intelligence model, a customized digital record in a data repository, the customized digital record configured for the electronic profile by modifying the at least one template object using the combination of the plurality of digital resources;

monitor at least one of feedback or a progression status associated with the customized digital record or the electronic profile;

transmit, to at least one computing device associated with the electronic profile, an alert signal associated with the feedback or the progression status; and iteratively modify, responsive to transmission of the alert signal to the at least one computing device, the customized digital record stored in the data repository based on the feedback or the progression status.

* * * * *